United States Patent
Kajiki et al.

(10) Patent No.: US 9,151,835 B2
(45) Date of Patent: Oct. 6, 2015

(54) MOVING OBJECT TRACKING APPARATUS, AND MOVING OBJECT TRACKING METHOD

(71) Applicant: FUJITSU LIMITED, Kawasaki-shi (JP)

(72) Inventors: Junko Kajiki, Kawasaki (JP); Mitsuru Ochi, Kawasaki (JP); Tomonori Ikeya, Sagamihara (JP); Kazuhiko Shite, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 297 days.

(21) Appl. No.: 13/741,048

(22) Filed: Jan. 14, 2013

(65) Prior Publication Data

US 2013/0222177 A1  Aug. 29, 2013

(30) Foreign Application Priority Data

Feb. 27, 2012  (JP) .................................. 2012-040638

(51) Int. Cl.
| | |
|---|---|
| *G01S 13/00* | (2006.01) |
| *G01S 13/66* | (2006.01) |
| *G01S 13/52* | (2006.01) |
| *G01S 13/72* | (2006.01) |
| *G01S 13/91* | (2006.01) |

(52) U.S. Cl.
CPC ................ *G01S 13/66* (2013.01); *G01S 13/52* (2013.01); *G01S 13/723* (2013.01); *G01S 13/91* (2013.01)

(58) Field of Classification Search
CPC ................................ G01S 13/56; G01S 13/62
USPC ......................................................... 342/107
See application file for complete search history.

(56) References Cited

U.S. PATENT DOCUMENTS 5,519,618 A    5/1996   Kastner et al.
(Continued)

FOREIGN PATENT DOCUMENTS

| JP | 2000-172980 A | 6/2000 |
|---|---|---|
| JP | 2001-004742 A | 1/2001 |
| JP | 2002-099986 A | 4/2002 |

(Continued)

OTHER PUBLICATIONS

Extended European Search Report dated Jun. 19, 2013 for corresponding European Application No. 13150779.0.
Office Action of Korean Patent Application 10-2013-0013295 dated Feb. 28, 2014, with English translation, 10 pages.
Japanese Office Action mailed Jul. 14, 2015 for corresponding Japanese Patent Application No. 2012-040638, with Partial English Translation, 8 pages.

*Primary Examiner* — Timothy A Brainard
(74) *Attorney, Agent, or Firm* — Fujitsu Patent Center

(57) ABSTRACT

A detection information memory stores, for each object, detection information that includes a distance to and a traveling speed of an object for each predetermined timing detected by a radar apparatus which detects detection information on the object, and the radar apparatus detects the detection information by receiving a reflected wave of an irradiated radar wave from the object. A predictor predicts, for each object, the detection information to be newly detected by the radar apparatus from a history of the detection information. A tracker tracks the object by identifying the object which is the target of the detection information newly detected using a result of the predictor; a determiner determines whether the object is a fixed object or a moving object. An output unit outputs the detection information on the object determined to be the moving object by the determiner.

20 Claims, 9 Drawing Sheets

(56) References Cited

U.S. PATENT DOCUMENTS

| | | | | |
|---|---|---|---|---|
| 6,085,151 | A | * | 7/2000 | Farmer et al. ............... 701/301 |
| 8,035,549 | B1 | * | 10/2011 | Malakian et al. ............. 342/95 |
| 2011/0295549 | A1 | | 12/2011 | Takabayashi et al. |

FOREIGN PATENT DOCUMENTS

| | | |
|---|---|---|
| JP | 2005-189081 A | 7/2005 |
| JP | 2008-051614 A | 3/2008 |
| JP | 2011-247721 A | 12/2011 |

* cited by examiner

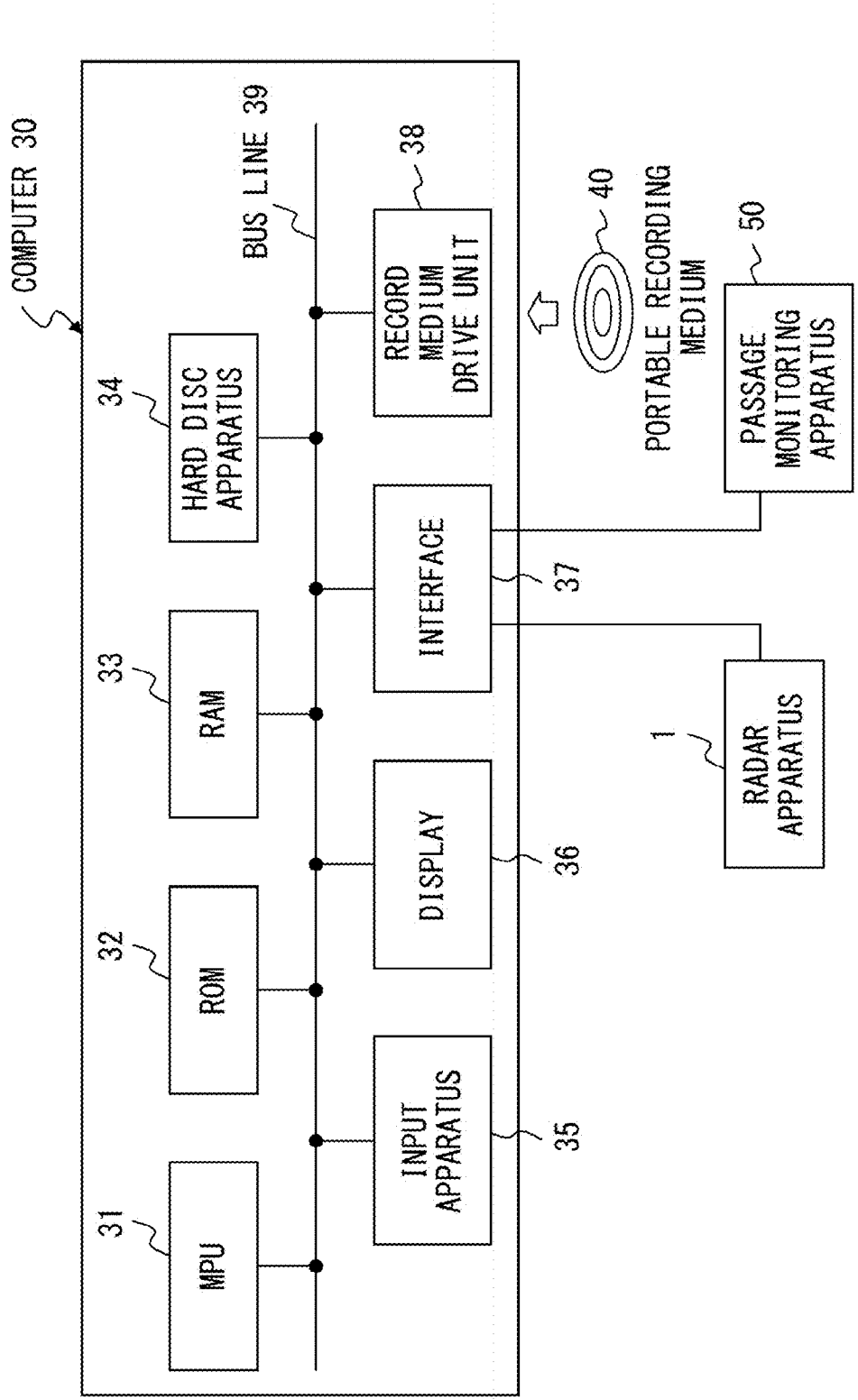
F I G. 4

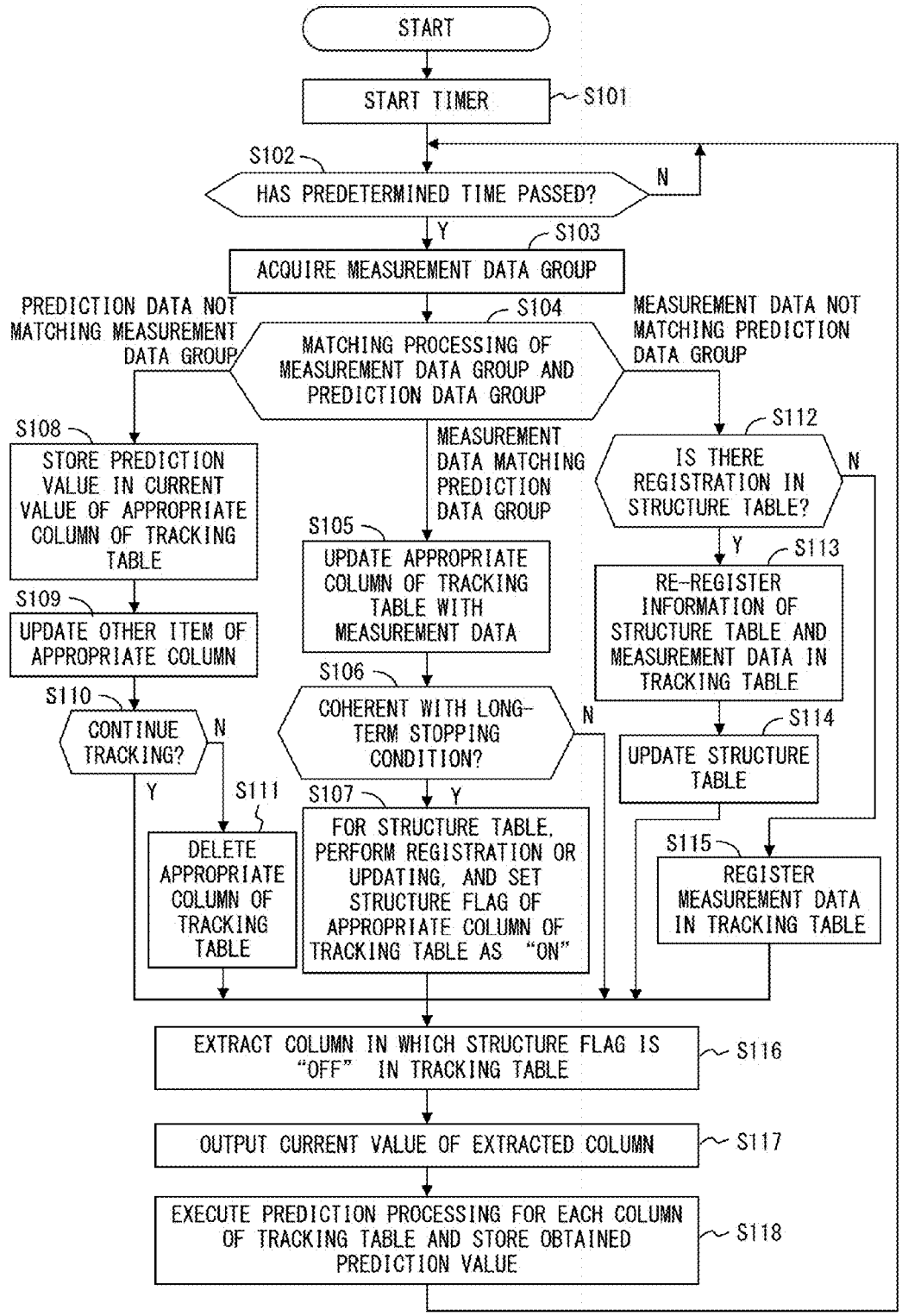
F I G. 5

| DISTANCE | TRAVELING SPEED |
|----------|-----------------|
| Da | Va |
| Db | Vb |

F I G. 6

| CURRENT DISTANCE | CURRENT SPEED | FIRST-APPEARANCE DISTANCE | FIRST-APPEARANCE SPEED | MEASURED NUMBER OF TIMES | TOTAL SPEED VALUE | AVERAGE SPEED | NUMBER OF CONTINUOUS FAILURES IN MEASUREMENT |
|---|---|---|---|---|---|---|---|
| Di | Vi | Dio | Vio | 10 | Vsi | Vai | 3 |
| Dj | 0 | Dj | 0 | 6 | 0 | 0 | 0 |

| PREDICTION DISTANCE | PREDICTION SPEED | NUMBER OF TIMES OF TRACKING | STRUCTURE FLAG |
|---|---|---|---|
| Din | Vai | 12 | OFF |
| Dj | 0 | 7 | ON |

TRACKING TABLE 61

F I G. 7

STRUCTURE TABLE 62

| ID | DISTANCE | MEASURED NUMBER OF TIMES | NUMBER OF TIMES OF TRACKING | TRACKING FLAG |
|---|---|---|---|---|
| aa | Daa | 10 | 12 | 0 |
| bb | Dbb | 6 | 7 | 2 |

FIG. 8

MOVING OBJECT TRACKING APPARATUS, AND MOVING OBJECT TRACKING METHOD

CROSS-REFERENCE TO RELATED APPLICATION

This application is based upon and claims the benefit of priority of the prior Japanese Patent Application No. 2012-040638, filed on Feb. 27, 2012, the entire contents of which are incorporated herein by reference.

FIELD

The embodiments discussed herein are related to techniques of detecting the presence of an object by using reflection of radio waves.

BACKGROUND

A technique of detecting the presence of a line of cars which stop before a road with poor visibility such as a curve, a rising slope, and the like, and of reporting the detection result to a succeeding vehicle is useful from the viewpoint of preventing rear-end accidents. As one such technique, a technique of traveling vehicles tracking and detecting by using a milliwave radar arranged on a road is known. In this technique, first, a position and a speed of a vehicle are predicted by using tracking data obtained by a first scanning. Then, segmentation processing and attribute forming processing are performed on the data obtained by the first scanning and to the position-speed data obtained by the second scanning, and the result is collated, respectively. Further explanation is given for the technique of traveling vehicles tracking and detecting.

In the technique of traveling vehicles tracking and detecting, first, background subtraction processing is applied to measurement data sent from a milliwave sensor. This processing is the processing of obtaining the difference between the measurement data and the background data, deleting background fixed structures including power poles, guardrails, and the like, and leaving the measurement data of the moving objects. By making the background out of the target of the later mentioned processing by performing the background subtraction processing, more time for processing may be allocated for the processing of a moving object tracking and detecting.

Concerning generation of background data, a technique is known, for example, in which the background data are generated by updating the background data by taking a weighted average of the previous background data for measurement data. A technique is also known in which updating the background data is controlled in accordance with a detection result of whether or not a background object which has been temporarily obscured by other object is present.

The above-mentioned technique of traveling vehicles tracking and detecting, following the background subtraction processing, performs segmentation processing which groups moving objects with substantially the same speed and attribute forming processing which obtains attributes including a barycentric position, a speed, and the like of the groups from the measurement data of these groups. Then, on the basis of the obtained attributes, prediction of measurement data which are obtained next for the groups is performed, and by collating this prediction result and the actually obtained measurement data, tracking these groups is performed.

Techniques described in each of the following documents are known.

Document 1: Japanese Laid-open Patent Publication No. 2002-99986
Document 2: Japanese Laid-open Patent Publication No. 2000-172980
Document 3: Japanese Laid-open Patent Publication No. 2001-4742

In the detection of a moving object by a radar apparatus, a position of the moving object, that is, a distance from the radar apparatus, and a speed of the moving object, that is, a relative speed of the moving object with respecting to the radar apparatus, are obtained as measurement data. Here, when a rotary scanning type is used as the radar apparatus, a presence direction of the moving object seen from the radar apparatus is also obtained as measurement data.

FIG. 1 schematically illustrates a detection system which includes a rotary scanning type radar apparatus 1 and a controller 2, the detection system detecting a vehicle 4 which travels on a road 3. The radar apparatus 1 detects the presence direction of the vehicle 4 and a tree which is a structure 6 positioned on a road side 3 by scanning a detection area 5 rightwards and leftwards on a horizontal surface.

As mentioned above, when a rotary scanning type radar apparatus is used, the presence direction of the moving object is also obtained as measurement data, and therefore, the position of the moving object is specified in two dimensions. The rotary scanning type radar apparatus, however, is provided with a mechanical mechanism for rotating antennas in order to make a radar wave scan on the horizontal surface, and for such a mechanism, a maintenance operation of the radar apparatus is performed.

On the other hand, in a non-scanning type radar apparatus, the position of the moving object is specified in one dimension. Accordingly, when there is a plurality of objects present at the same distance from the radar apparatus, with the non-scanning type radar apparatus, the measurement data of these objects are not obtained for each object.

FIG. 2 schematically illustrates a detection system which includes a non-scanning type radar apparatus 1 and a controller 2, the detection system detecting a vehicle 4 which travels on a road 3. In such a radar apparatus 1 that does not scan the detection area 5, the detection of the presence direction of the vehicle 4 is not performed.

Here, a case is considered in which the above-mentioned technique of the traveling vehicle tracking and detecting is performed by using the non-scanning type radar apparatus. In this case, when the vehicle stops for a while at the same position as the structure present at a road side with respect to the distance from the radar apparatus for example, since the data of the vehicle have been lost by the above-mentioned background processing, it is difficult to perform the vehicle tracking and detecting.

SUMMARY

According to an aspect of the embodiment, an apparatus includes a detection information memory, a predictor, a tracker, a determiner, and an output unit. The detection information memory stores, for each object, detection information that includes a distance to an object and a traveling speed of the object for each predetermined detection timing detected by a radar apparatus which detects detection information on the object, and the radar apparatus detects the detection information by receiving a reflected wave from the object which is present in an irradiation objective site of an irradiated radar wave. The predictor predicts, for each object, the detection information to be newly detected by the radar apparatus from a history of the detection information stored in the detection information memory. The tracker tracks the object by identifying the object which is the target of the detection information newly detected by the radar apparatus using a result of the predictor on the detection information. The determiner determines whether the object tracked by the tracker is a fixed object or a moving object using the history of the detection information on the object stored in the detection information memory. And the output unit outputs the detection information on the object determined to be the moving object by the determiner.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an example of a hardware configuration of a moving object tracking apparatus of FIG. 3.

FIG. 5 is a flowchart which graphically illustrates a processing content of processing of a moving object tracking.

FIG. 6 is a data example of detection information output from a radar apparatus 1.

FIG. 7 illustrates a structure of a tracking table.

FIG. 8 illustrates a structure of a structure table.

DESCRIPTION OF EMBODIMENTS

Preferred embodiments of the present invention will be explained with reference to accompanying drawings.

Figure 1:
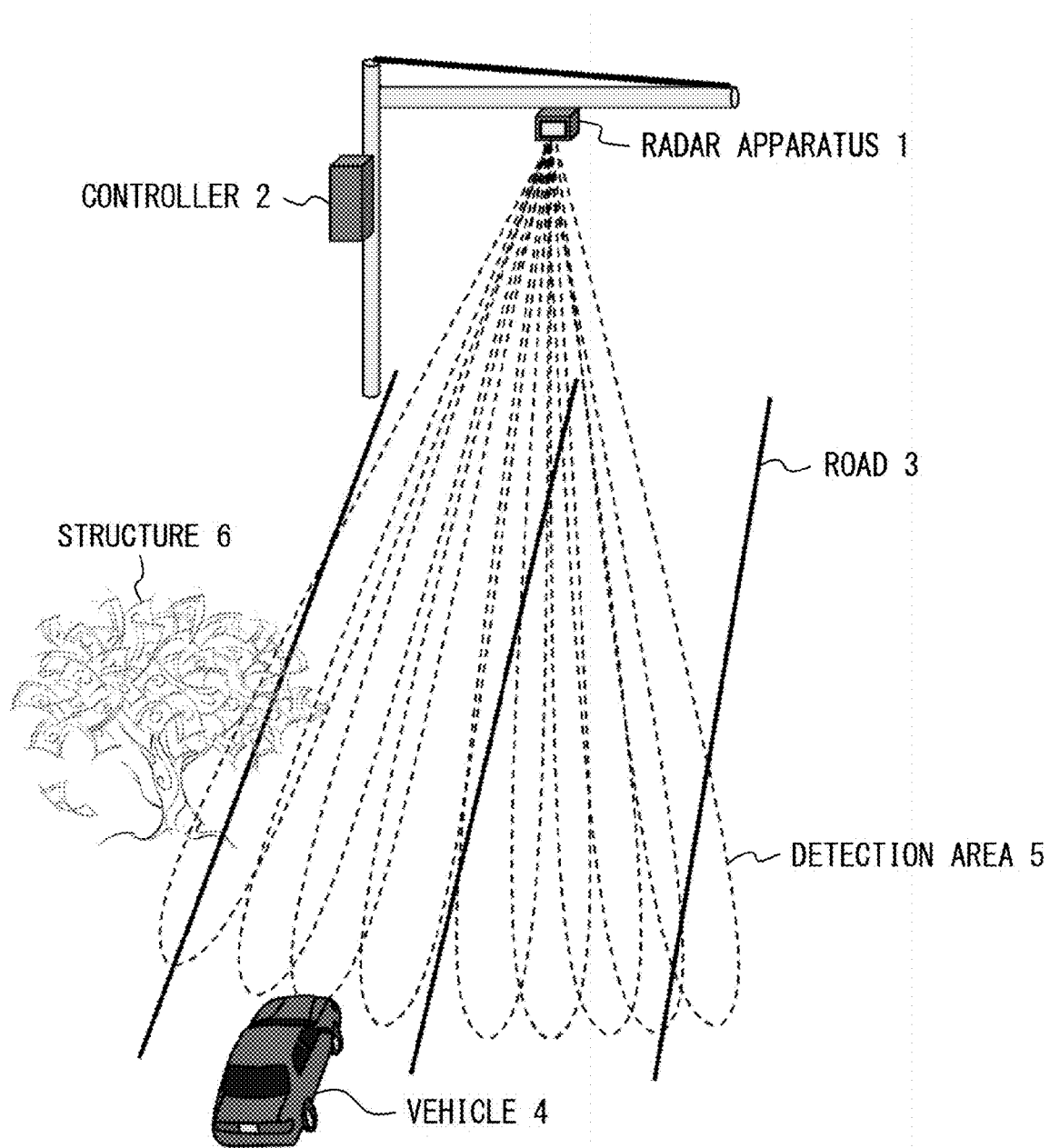
FIG. 1 is an explanatory drawing of a rotary scanning type radar apparatus.
Figure 2:
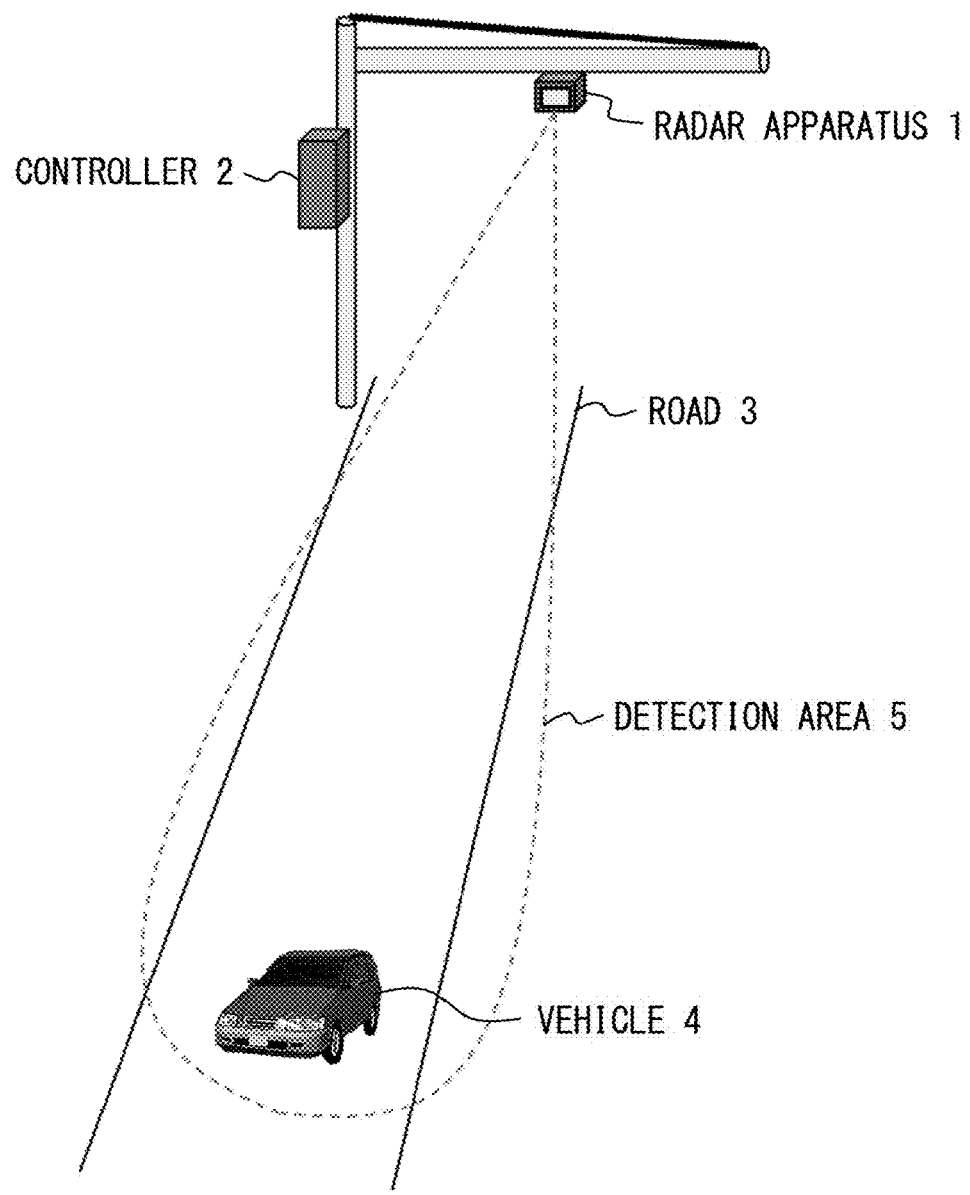
FIG. 2 is an explanatory drawing of a non-scanning type radar apparatus.
Figure 3:
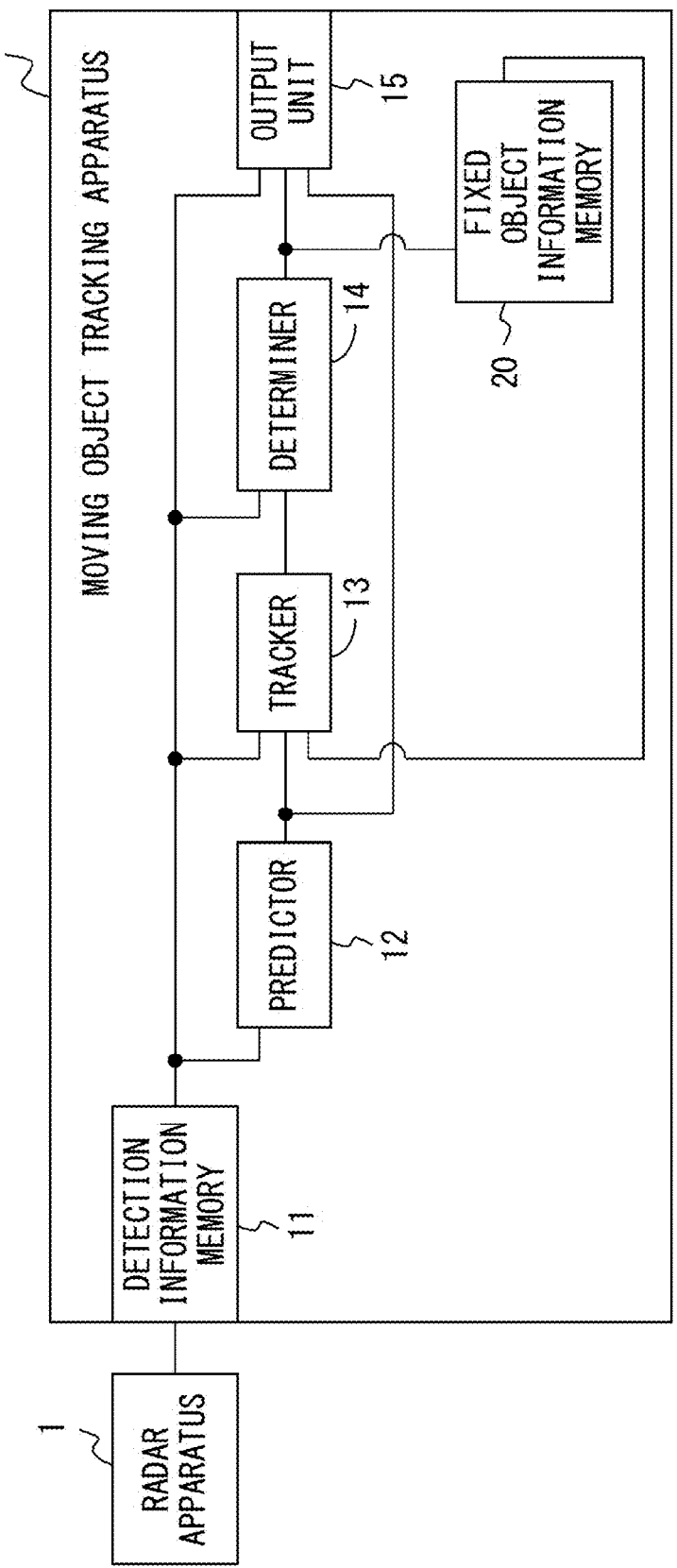
FIG. 3 is a functional block diagram which graphically illustrates a configuration of an example of a moving object tracking apparatus.

First, explanation is given for FIG. 3. FIG. 3 is a functional block diagram which graphically illustrates a configuration of an example of a moving object tracking apparatus.

In FIG. 3, a moving object tracking apparatus 10 includes a detection information memory 11, a predictor 12, a tracker 13, a determiner 14, and an output unit 15. In the examples, the moving object tracking apparatus 10 further includes a fixed object information memory 20, as graphically illustrated in FIG. 3.

A radar apparatus 1 is connected to the moving object tracking apparatus 10. The radar apparatus 1 detects a distance and a traveling speed to an object as the detection information on the object, by receiving a wave reflected by the object present in an irradiation objective site of an irradiated radar wave.

The detection information memory 11 is a storage device which stores detection information detected by the radar apparatus 1 for each predetermined detection timing for each object.

The predictor 12 predicts the detection information to be newly detected by the radar apparatus 1 for each object from a history of the detection information stored in the detection information memory 11.

The tracker 13 tracks the object by identifying an object which is the target of the detection information, having been detected newly by the radar apparatus 1 using a result of the detection information by the predictor 12.

The determiner 14 determines whether the object tracked by the tracker 13 is a fixed object or a moving object using the history of the detection information on the object stored in the detection information memory 11.

The output unit 15 outputs the detection information on an object which was determined to be a moving object by the determiner 14.

In the moving object tracking apparatus 10, the tracking a fixed object is also performed similarly to that of moving objects, without performing the above mentioned background processing. Here, the determination of whether the object being tracked is a fixed object or a moving object is performed using the history of the detection information on the object. Accordingly, the moving object tracking is continued even when the moving object temporarily stops at the same position as a fixed object which is a background object.

In the moving object tracking apparatus 10, the predictor 12 predicts the distance in the detection information to be newly detected by the radar apparatus 1, for example. At this time, the tracker 13 performs detection when the difference between the predicted distance and the distance in the newly detected detection information is smaller than the predetermined distance threshold. The tracker 13, when such a case is detected, identifies the object which is the target of the newly detected detection information as the object which is the target of the history of the detection information used by the predictor 12 for the prediction of the predicted distance.

A case in which the difference is smaller than the predetermined distance threshold is a case in which the travelling of the object which is the target of the detection information is within the range predicted by the predictor 12, and in such a case, the moving object tracking apparatus 10 estimates that the tracking the object has been appropriately performed.

In the moving object tracking apparatus 10, the determiner 14 determines that an object which is a target of the history of the detection information is a fixed object when a traveling speed represented by the oldest history of the histories of the detection information stored in the detection information memory 11 is smaller than the predetermined speed threshold. More specifically, in the detection information which is stored for each object in the detection information memory 11, the determiner 14 determines that the object which is the target of the history of the detection information is a fixed object when the traveling speed at which the radar apparatus 1 firstly detects the object is smaller than the predetermined speed threshold.

A speed threshold is preferably set as a value which is in the vicinity of "0". In this case, since the object which is the target of the history of the detection information is estimated to remain in a resting state from the beginning when detected by the radar apparatus 1, the object is determined to be a fixed object.

Further, it may be configured that the determiner 14 determines that the object which is the target of the history of the detection information is a fixed object when the detection information on the object which is the target of the history of the detection information is obtained at a predetermined or greater detection frequency threshold by the radar apparatus 1. With this configuration, the effect of noise which may be temporarily included in the detection information by the radar apparatus 1 is suppressed, and the possibility that the object that is a fixed object really exists is improved.

Further, it may be configured that the determiner 14 determines that the object which is the target of the history of the detection information is a fixed object when the tracker 13 tracks the object which is the target of the history of the detection information at a predetermined or greater tracking frequency threshold. With this configuration, the effect of noise which may be temporarily included in the detection information by the radar apparatus 1 is further suppressed, and the possibility that the object that is a fixed object really exists is further improved.

In some cases, in the moving object tracking apparatus 10, the detection information on the object which has been tracked by the tracker 13 is not included in the detection information which is newly detected by the radar apparatus 1. When the object is determined to be a moving object by the determiner 14, the output unit 15 may be configured to output the above mentioned prediction result of the predictor 12 as the newly detected detection information on the object.

Although detailed explanation will be given later, when the other object is temporarily entered between the radar apparatus 1 and the object of the detection target, for example, the detection information on the object of the detection target is not obtained from the radar apparatus 1. In such a case, it is preferable to continue tracking the object of the detection target and to not stop tracking immediately. Here, as the output unit 15 outputs the above mentioned prediction result of the predictor 12 as the newly detected detection information on the object, the prediction result of the detection information on the object of the detection target in which the actual detection information by the radar apparatus 1 is not obtained.

Further, in the moving object tracking apparatus 10, it may be configured that the tracker 13 stops tracking the object when the detection information on the object which has been tracked by the tracker 13 is not continuously included with the predetermined times in the detection information newly detected by the radar apparatus 1.

In such a case, it is appropriate to judge that the object is outside the area which may be detected by the radar apparatus 1. Accordingly, in this case, it is preferable to stop further tracking the object to reduce the processing load of the tracking processing.

A fixed object information memory 20 included in the moving object tracking apparatus 10 of FIG. 3 stores the information of the distance on the object which was determined to be a fixed object by the determiner 14. Here, when the object which is the target of the newly detected detection information was not identified by the prediction result on the detection information by the predictor 12, the tracker 13 may resume tracking the object as follows. That is, at this time, the tracker 13 performs detection of the case in which the difference between the distance represented by the distance information stored in the fixed object information memory 20 and the distance in the newly detected detection information is smaller than the predetermined distance threshold. When this case is detected, the tracker 13 identifies the object which is the target of the newly detected detection information as the object which is the target of the information of the distance stored in the fixed object information memory 20, and resumes the tracking the object. With this, concerning the object which is a fixed object, such recognition is obtained that the object present in the same position before stopping the tracking and after resuming the tracking is the same, even when the tracking is resumed after it was stopped once, as mentioned above.

The moving object tracking apparatus 10 includes the above mentioned components. In the explanation afterward, it is defined that the radar apparatus 1 is arranged on a road and detects a vehicle which is a moving object and which travels on the road and the structures which are fixed around the road, and that the moving object tracking apparatus 10 outputs the detection information on the vehicle.

Subsequently, explanation is given for FIG. 4. FIG. 4 illustrates one example of a hardware configuration of the moving object tracking apparatus 10 of FIG. 3.

In the configuration example, the moving object tracking apparatus 10 is constituted of a computer 30. In FIG. 4, the radar apparatus 1 and a passage monitoring apparatus 50 are connected to the computer 30. The passage monitoring apparatus 50 is an apparatus which monitors a flow of vehicles traveling along the road using the detection information concerning the vehicles traveling along the road, the detection information being output of the computer 30, that is, the passage monitoring apparatus 50 is an apparatus which monitors, for example, traffic and speed.

The computer 30 includes an MPU 31, a ROM 32, a RAM 33, a hard disc apparatus 34, an input apparatus 35, a display 36, an interface 37, and a record medium drive unit 38. These components are connected via a bus line 39 and various data may be transmitted and received under the management of the MPU 31.

The MPU (Micro Processing Unit) 31 is an operation processing unit which controls the operation of the entire computer 30.

The ROM (Read Only Memory) 32 is a read only semiconductor memory in which predetermined basic control programs are prerecorded. The MPU 31 may control the operation of each component of the computer 30 by reading and executing the basic control program at a start-up of the computer 30. A memory in which the storage data are non-volatile, such as a flash memory and the like, may also be used as the ROM 32.

The RAM (Random Access Memory) 33 is a semiconductor memory which is writable and readable at any time and which is used as a storage area for operation, as needed, when the MPU 31 executes various control programs. The RAM 33 may function as the detection information memory 11 and the fixed object information memory, when the moving object tracking apparatus 10 is constituted by the computer 30.

The hard disc apparatus 34 is a storage apparatus which stores various control programs or various data executed by the MPU 31. As the MPU 31 reads and executes the predetermined control program stored in the hard disc apparatus 34, various instances of control processing may be performed by the MPU 31.

The input apparatus 35 is, for example, a keyboard apparatus or a mouse apparatus, and when it is operated, for example, by a manager of the moving object tracking apparatus 10, the input apparatus 35 acquires the input which is made to correspond to an operational content of various information from the manager and sends the acquired input information to the MPU 31.

The display 36 is, for example, a liquid crystal display, and displays various text or images in accordance with the display data which are sent from the MPU 31.

The interface 37 manages transmission and reception of various pieces of information between various apparatuses connected to the computer 30. The radar apparatus 1 and the passage monitoring apparatus 50 are connected to the interface 37. In other words, the detection information output from the radar apparatus 1 is taken in the computer 30 via the interface 37, and the detection information on the vehicle which travels on the road which is output from the computer 30 is sent to the passage monitoring apparatus 50 via the interface 37.

The record medium drive unit 38 is an apparatus which reads various programs or data recorded in a portable recording medium 40. The MPU 31 may perform various later mentioned instances of control processing by reading and executing the predetermined control program recorded in the portable recording medium 40 via the record medium drive unit 38. As the portable recording medium 40, for example, a CD-ROM (Compact Disc Read Only Memory), a DVD-ROM (Digital Versatile Disc Read Only Memory), and a flash memory provided with a connecter which corresponds to a USB (Universal Serial Bus) standard are exemplified.

In order to constitute the moving object tracking apparatus 10 by the above mentioned computer 30, a control program is prepared for causing the MPU 31 to perform the later mentioned moving object tracking processing, for example. The prepared control program is stored in the hard disc apparatus 34 or the portable recording medium 40 in advance. Then, by providing a predetermined instruction to the MPU 31, the MPU is caused to read and execute the control program. With this, the computer 30 starts to function as the detection information memory 11, the predictor 12, the tracker 13, the determiner 14, the output unit 15, and the fixed object information memory 20, and the moving object tracking apparatus 10 is constituted by the computer 30.

Subsequently, explanation is given for moving object tracking processing which is performed in the computer 30. FIG. 5 is a flow chart which graphically illustrates the processing content of the moving object tracking processing.

When the processing of FIG. 5 is started, first, in step S101, the MPU 31 performs the timer start-up processing. This processing is the processing of initializing the timer with which the MPU 31 itself is provided and starting time-keeping.

Subsequently, in step S102, the MPU 31 performs the processing of determining whether or not the predetermined time has passed by referring to the numerical value of the timer which started the time-keeping in the processing of step S101. The MPU 31 goes through the processing to step S103 when the determination result is Yes, that is, when the MPU 31 determined that the predetermined time has passed. On the other hand, the MPU 31 returns the processing to step S102 and repeats the above mentioned processing, when the determination result is No, that is, when the MPU 31 determined that the predetermined time has not passed.

In step S103, the MPU 31 performs the processing of acquiring a measurement data group. This processing is the processing of acquiring the detection information on the object which is output from the radar apparatus 1.

Figure 6:
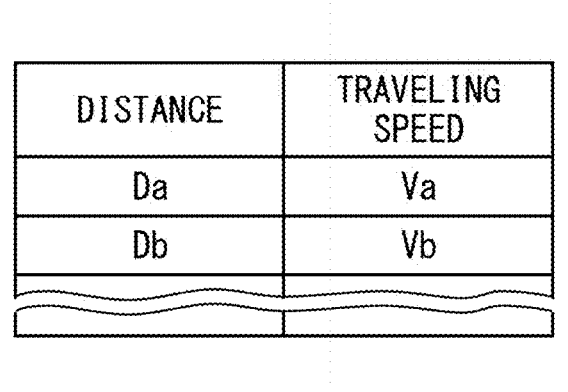

Here, explanation is given for a measurement data group by using FIG. 6.

FIG. 6 is a data example of the detection information which is output from the radar apparatus 1. As illustrated in FIG. 6, the detection information relates to the data which associate the data of the distance with the data of the traveling speed of the object, for each distance from the radar apparatus 1 to the object. In the examples, it is defined that a set of data which consists of the data of the distance and the data of the traveling speed which are associated for each object is called "measurement data", and that a plurality of measurement data in which the data of the distance differ from one another is called a "measurement data group".

Subsequently, in step S104, the MPU 31 performs the processing of matching a measurement data group and a prediction data group acquired by the processing of step S103.

Here, explanation is given for the prediction data group and the matching process by using FIG. 7.

FIG. 7 illustrates a structure of a tracking table.

The tracking table 61 is a table in which the data of the detection information output from the radar apparatus 1 are stored for each object that is the target of the detection information, and it is the table which is arranged in a predetermined storage area in the RAM 33. In the tracking table 61, the data of the detection information on each object are stored in each column.

Hereafter, explanation is given for items of each column of the tracking table 61.

In the columns "current distance" and a "current speed", the distance data and the traveling speed data in the detection information on the object that is the target of the detection output from the radar apparatus 1 lastly are stored, respectively. Although a detailed explanation is given later, when there was no detection information on the object of the detection target in the last output from the radar apparatus 1, prediction values on the detection information on the object of the detection target are stored in the respective columns.

In the columns "first-appearance distance" and a "first-appearance speed", the distance data and the traveling speed data in the detection information on the object that is the target of the detection firstly output from the radar apparatus 1 are stored, respectively.

In the column "measured number of times", the number of times which the radar apparatus 1 was actually capable of detecting the object of the detection target, that is, the number of times which the radar apparatus 1 received the detection information on the object of the detection target, is stored.

In the column "total speed value", the total value of the data of the traveling speed in each detection information on the object of the detection target, that is, the detection information including the detection information having been firstly output from the radar apparatus 1 and being output lastly are stored.

In the column "average speed", the average traveling speed of the object of the detection target, that is, the resulting value obtained by dividing the "total speed value" by the "measured number of times", is stored.

In the column "number of continuous failures in measurement", the continuous number of cases in which the detection information on the object of the detection target is not included in the output from the radar apparatus 1, that is, the continuous number of cases in which the measurement by the radar apparatus 1 fails, is stored.

In the columns "prediction distance" and "prediction speed", prediction values of the distance data and the traveling speed data in the detection information on the object that is the target of the detection subsequently output from the radar apparatus 1, the prediction values of the distance data and the traveling speed data being predicted from the "current distance" and the "current speed", are stored respectively.

In the column "number of times of tracking", the continuous number of times of the tracking in the case where the moving object tracking apparatus 10 is capable of continuing tracking the object of the detection target is stored. Although the detailed explanation is given later, the moving object tracking apparatus 10 continues tracking the object using the prediction value of the detection result even during the time period when the radar apparatus 1 is not capable of detecting the object of the detection target.

In the column "structure flag", a flag which indicates whether the object of the detection target is a fixed object or a moving object is stored. Although the detailed explanation is given later, an initial value of the flag is set as "OFF" to indicate that the object of the detection target is a moving object, and after that, when the initial value of the flag is matched up with the later-mentioned predetermined condition, the initial value of the flag is set as "ON" to indicate that the object of the detection target is a fixed object.

In the tracking table 61, for each object of the detection target, the data for the above mentioned items are stored. Here, a set of data consisting of the "prediction distance" and the "prediction speed" in the object of the detection target are defined as "prediction data", and a plurality of measurement data in which the distance data differ with each other is defined as a "prediction data group".

In the matching processing of step S104 in FIG. 5, by comparing each measurement datum of the above-mentioned measurement data group with each prediction datum of the above-mentioned prediction data group, the processing of determining whether or not each measurement datum and each prediction datum get together is carried out. However, in the determination for the "prediction distance" and of the "prediction speed" which are the prediction data, a predetermined permissible range with the values of "prediction distance" and of the "prediction speed" being defined as central values is set, and when the measurement data take the values which are within the permissible range, it is determined that the measurement data and the prediction data get together.

In the matching processing of step S104, further, as a result of the above-mentioned determination processing, processing of classifying each measurement datum of the measurement data group into the measurement data in which the prediction data which match up with the prediction data group and the measurement data in which the prediction data which do not match up with the prediction data group is performed. Further, processing of extracting from the prediction data group prediction data which did not match up with any measurement data of a measurement data group is performed.

For the measurement data in which the prediction data which match up with the prediction data group are present among each of the data after the above mentioned matching processing, the later mentioned processing of steps S105 to S107 is performed. Further, for the measurement data in which the prediction data which match up with the prediction data group are not present, the later mentioned processing of steps S112 to S115 is performed. Further, for the prediction data which did not match up with any measurement data in the measurement data group, the later mentioned processing of steps S108 to S111 is performed. Explanation is given for each of the types of processing.

First, explanation is given for processing of steps S105 to S107.

In step S105, by referring to the column in which the prediction data determined to be matching up with the measurement data by the matching process was stored, the MPU 31 performs processing of updating each item of the column using the measurement data. Specifically, the data of the distance and the data of the traveling speed included in the measurement data are stored in the "current distance" and the "current speed" in the column, respectively. Further, in the "measured number of times", the value in which "1" was added to the value stored in the "measured number of times" at the time of the processing is stored. And, in the "total speed value", the value in which the data of the traveling speed included in the measurement data are added to the value stored in the "measured number of times" at the time of the processing is stored. Further, in the "average speed", the value which is obtained by dividing the value after updating of the "total speed value" by the value after updating of the "measured number of times" is stored. In the "number of continuous failures in measurement", the value "0" is stored to be initialized, and in the "number of times of tracking", the value in which "1" is added to the value stored in the "number of times of tracking" at the time of the processing is stored.

Subsequently, in step S106, the MPU 31 performs processing of determining whether or not the object of the detection target matches up with the long-term stopping condition, which is the condition of determining whether or not the object of the detection target in which various data are stored in the column of the tracking table 64 which is referred to by the processing of step S105 is a fixed object or not.

The first condition of the long-term stopping condition is that the value of the "first-appearance speed" on the object is not greater than a predetermined threshold, and more specifically, the value of the "first-appearance speed" on the object is at a speed of zero or in the vicinity of zero. Since such an object is estimated to be in a resting state from the beginning when the object is detected by the radar apparatus 1, the object may be judged to be a fixed object.

In the examples, as a long-term stopping condition, the second condition is further imposed. The second condition is that the value of the "measured number of times" on the object is not less than a predetermined threshold. By imposing the second condition, the effect of noise which may be temporarily included in the detection information by a radar apparatus 1 is suppressed and the possibility that the object which is a fixed object really exists is improved.

Further, in the present example, as a long-term stopping condition, the third condition is also imposed. The third condition is that the value of the "number of times of tracking" on the object is not less than a predetermined threshold. By imposing the third condition, the effect of noise which may be temporarily included in the detection information by a radar apparatus 1 is suppressed and the possibility that the object which is a fixed object really exists is improved as well.

Either or both of the second and the third conditions may be excluded from the long-term stopping condition.

The MPU 31 goes through the processing to step S107 when the determination result is Yes in the determination procedure of step S106, that is, when the MPU 31 determines that the data on the object of the detection target stored in the tracking table 61 matches up with the long-term stopping condition. On the other hand, the MPU 31 goes through the processing to step S116 when the determination result is No in the determination procedure of step S106, that is, when the MPU 31 determines that the data on the object of the detection target does not match up with the long-term stopping condition.

In step S107, the MPU 31 performs processing of setting the "structure flag" in the storage column of the data on the object of the detection target in the tracking table 61 as the value "ON" together with performing registration or updating for the structure table, and after that, goes through the processing to step S116.

Here, explanation is given for the structure table. FIG. 8 illustrates a structure of the structure table.

The structure table 62 is the table in which various information is stored on the object determined to be a fixed object, that is, the structure by the moving object tracking apparatus 10, and the structure 62 is the table which is arranged in a storage area predetermined by the RAM 33. In the structure table 62, the data of the detection information on each object which is a fixed object are stored in each column.

Hereafter, explanation is given for the items of each column of the structure table 62.

In the column "ID", an identification cord separately provided to each structure is stored.

In the column "distance", the distance data of the targeted structure from the radar apparatus 1 are stored.

In the column "measured number of times", the number of times in which the radar apparatus 1 was actually capable of detecting the targeted structure is stored.

In the column "number of times of tracking", the continuous number of times of tracking when the moving object tracking apparatus 10 is capable of continuing tracking the targeted structure is stored.

In the column "tracking flag", the flag which indicates the current situation of the tracking of the targeted structure is stored. More specifically, when the flag indicates "0", it indicates that the tracking of the targeted structure is performed using the detection information from the radar apparatus 1. In addition, when the flag indicates "1", it indicates that the tracking of the targeted structure is discontinued. Further, when the flag indicates "2", it indicates that the tracking of the targeted structure is not performed using the detection information from the radar apparatus 1, but that the tracking using the prediction value of the detection information is performed.

In the processing of step S107 of FIG. 5, the MPU 31 firstly acquires the value of the "current distance" in the column of the tracking table 61 which is referred to by the processing of step S105, and the MPU 31 performs the processing of searching from the "distance" data in the structure table 62 for data which matches up with the value of the "current distance". In the searching processing, however, concerning the "distance" data in the structure table 62, a predetermined permissible range is set with the values of "current distance" being determined to be central values, and when the value of the "current distance" is a value within the permissible range, it is defined that the "current distance" matches up with the "distance".

By the searching process, when the "distance" data which match up with the "current distance" data are searched out, the MPU 31 performs processing of updating the data of the column of the structure table 62 in which the "distance" data were included. More specifically, the MPU 31 performs processing of storing the values of the "measured number of times" and the "number of times of tracking" in the column of the tracking table 61 which is referred to by the processing of step S105 in the "measured number of times" and the "number of times of tracking" in the column of the tracking table 62 in which the "distance" data were included. Further, the MPU 31 sets the value of the "tracking flag" in the column as "0". At this time, the value of the "distance" in the column in the structure table 62 may be replaced with the value of the "current distance" in the column in the tracking table 61, or may be replaced with the average value of both values of the "distance" and the "current distance". In calculating the average value of both values, a weighted average may be calculated.

On the other hand, when the "distance" data which match up with the "current distance" value were not found by the above mentioned searching processing, the MPU 31 performs processing of registering a new column in the structure table 62. More specifically, the MPU 31 stores a value which is different from the value of the other column of the structure table 62 as an "ID", and stores the value of the "current distance" in the column of the tracking table 61 referred by the processing of step S105 as a "distance". The MPU 31 further stores the "measured number of times" and "number of times of tracking" in the column of the tracking table 61 as the "measured number of times" and the "number of times of tracking" and sets the value of the "tracking flag" in the column as "0".

Subsequently, explanation is given for processing of steps S108 to S111.

As mentioned above, processing of steps S108 to S111 is performed to the prediction data which did not match up with any measurement datum of the measurement data group. This illustrates the case where the object which is the target of the prediction data was not detected this time by the radar apparatus 1 and that the tracking by the measurement data was not performed. Such a case includes, for example, when the occlusion has occurred. Explanation is given for the occlusion by using FIG. 9.

Figure 9:
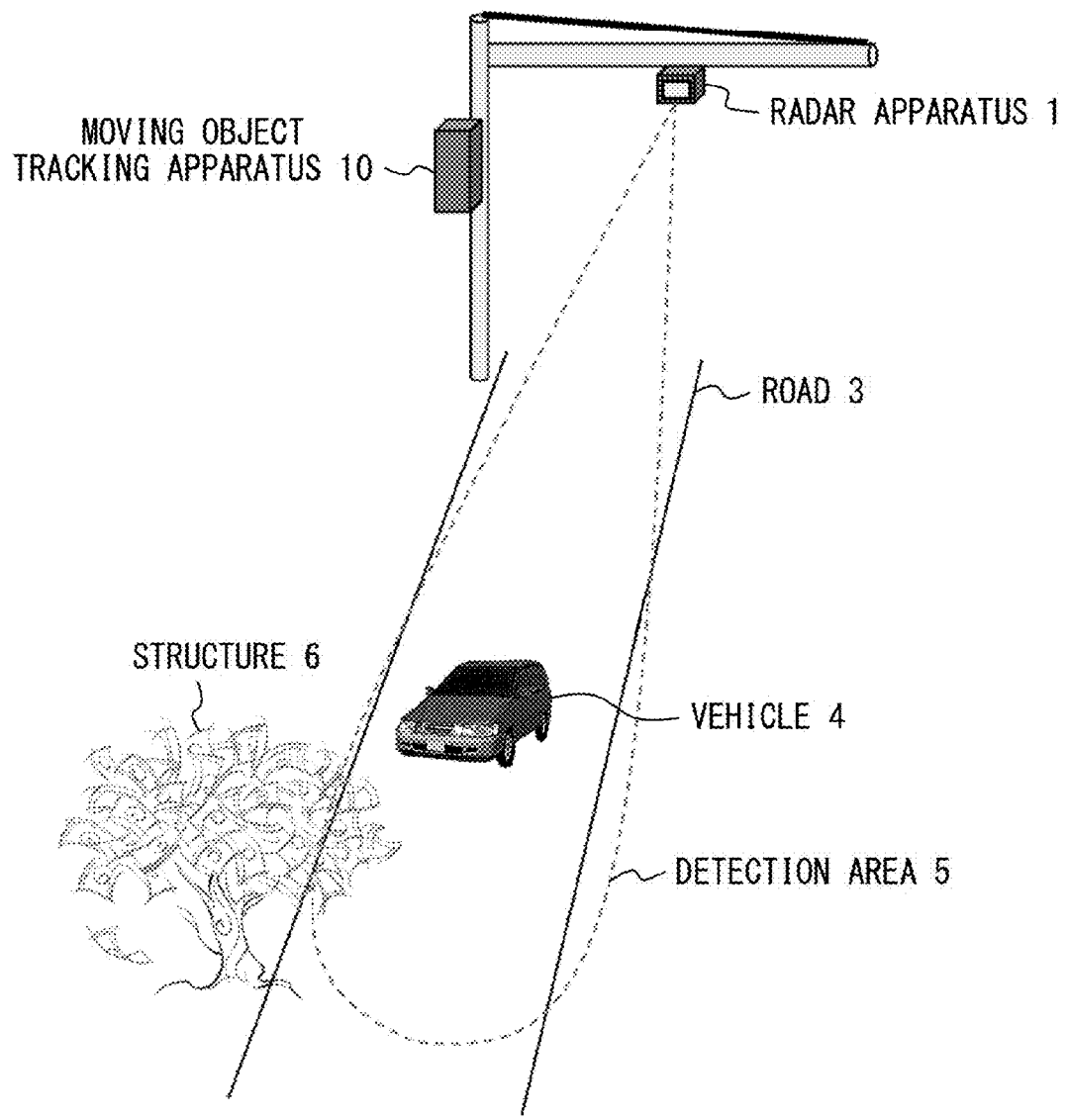
FIG. 9 is an explanatory drawing of occlusion.

In FIG. 9, both a vehicle 4 which travels on a road 3 and a tree which is a structure 6 positioned at a roadside of a road 3 are present within a detection range 5 of a radar apparatus 1 connected to the moving object tracking apparatus 10. In the example of FIG. 9, since the vehicle 4 is positioned between the radar apparatus 1 and the structure 6, when seen from the radar apparatus 1, the structure 6 is hidden by the vehicle 4 and as a result, the radar apparatus 1 loses sight of the structure 6. Such a phenomenon wherein the radar measurement of the object is discontinuous because the object is hidden by the other object is called occlusion.

The moving object tracking apparatus 10, even when the measurement of the object which is the detection target by the radar apparatus 1 is discontinued by occlusion and the like, continues tracking the object using the prediction value of the detection result for a while. Further, the moving object tracking apparatus 10 of the examples outputs the prediction data instead of the measurement data during the time period when the measurement of the object which is the detection target by the radar apparatus 1 is discontinued. Processing of steps S108 to S111 is the processing for realizing the functions in the moving object tracking apparatus 10.

First, in step S108, the MPU 31 performs the processing of storing the value of the prediction data in the "current distance" and the "current speed" of the columns by referring to the column of the tracking table 61 in which the prediction data which did not match up with any measurement data were stored. The values of the prediction data are, specifically, the values of the "prediction distance" and the "prediction speed". By performing the processing, in the later mentioned output processing in step S116, for an object which is a moving object to which the tracking by the measurement data was not performed, the prediction data instead of the measurement data are output.

Subsequently, in step S109, the MPU 31 performs processing of updating the other item of the column of the tracking table 61 referred to by the processing of step S108. Specifically, in the "number of continuous failures in measurement" in the column, the value in which "1" is added to the value stored in the "number of continuous failures in measurement" at the time of the processing is stored. Further, in the "number of times of tracking", the value in which "1" is added to the value stored in the "number of times of tracking" at the time of the processing is stored. The MPU 31 also performs processing of setting "2" as the value of the "tracking flag" in the column in the structure table 62 on the fixed object with the data illustrated in the column, when the "structure flag" in the column of the tracking table 61 which is referred to was "ON".

Subsequently, in step S109, the MPU 31 performs processing of determining whether or not the tracking the object which is the target of the column of the tracking table 61 which is referred to by the processing of step S108 is continued. More specifically, the MPU 31 performs processing of reading the value of the "number of continuous failures in measurement" in the column and of determining whether or not the value is less than a predetermined stop-tracking determination threshold. The stop-tracking determination threshold is the value of several times to around ten times, for example. When the determination result is Yes, that is, when the "number of continuous failures in measurement" is determined to be less than the threshold, the MPU 31 determines to continue tracking the object and goes through the processing to step S116. On the other hand, here, the MPU 31, when the determination result is No, or when the "number of continuous failures in measurement" is determined to be not less than the threshold, determines to stop the tracking the object and goes through the processing to step S111.

In step S111, the MPU 31 performs the processing of deleting the column which is referred to by the processing of step S108 from the tracking table 61 and of stopping the tracking the object which is the target of the column, and after that, the MPU 31 goes through the processing to step S116. At this time, the MPU 31 also performs the processing of setting the "tracking flag" of the column in the structure table 62 on the fixed object in which the data were illustrated in the column as the value "1", when the "structure flag" of the column deleted from the tracking table 61 was "ON".

Subsequently, explanation is given for processing of steps S112 to S115.

As mentioned above, processing of steps S112 to S115 is the processing which is performed for the measurement data which did not match up with any prediction data of the prediction data group. The processing includes newly registering the measurement data in the tracking table 61 and starting the tracking the object which is the target of the measurement data. In some cases, however, even though the tracking was performed on the object which was the target of the measurement data in the past, the tracking is discontinued due to the long-term continuous stopping of the measurement by the radar apparatus 1. In particular, when the object is a fixed object, it may sometimes occur that the information on the object is already registered in the structure table 62 by tracking which was performed in the past. Therefore, in the processing of steps S112 to S115, processing for preventing double registration of the same object in the structure table 62 is also performed.

First, in step S112, the MPU 31 performs processing of determining whether or not the information on the object which is the target of the measurement data which did not match up with any prediction datum is registered in the structure table 62. More specifically, in the processing, the MPU 31 performs processing of searching from the "distance" data in the structure table 62 the datum which matches up with the distance data in the measurement data which did not match up with any prediction datum. In the searching processing, however, concerning the "distance" data in the structure table 62, a predetermined permissible range is set with the values of "distance" data being determined to be central values, and when the distance value in the measurement data is the value which is within the permissible range, it is defined that both are determined to get together.

The MPU 31, in the determination processing in step S112, when the determination result is Yes, that is, when the information on the object which is the target of the measurement data is determined to be registered in the structure table 62, goes through the processing to step S113. On the other hand, the MPU 31, in the determination processing in step S112, when the determination result is No, that is, when the information on the object which is the target of the measurement data is not determined to be registered in the structure table 62, goes through the processing to step S115.

In step S113, the MPU 31 performs processing of re-registering the data on the object in the tracking table 61 by using the measurement data which did not match up with any prediction datum and the information of the structure table 62 on the object which is the target of the measurement data. Specifically, the "distance" data on the object which is the target in the structure table 62 are stored in the "current distance" and the "first-appearance distance" in the tracking table 61. Since the object is a fixed object, the value "0" is stored in the "current distance", the "first-appearance distance", the "total speed value", and the "average speed" in the tracking table 61. Further, in the "measured number of times" and the "number of times of tracking" in the tracking table 61, the value in which "1" was added to the value stored in the "measured number of times" and the "number of times of tracking" on the object which is the target in the structure table 62 at the time of processing is stored. In the "number of continuous failures in measurement", the value "0" is stored to be initialized, and in the "structure flag", the value "ON" which illustrates that the object is a fixed object is stored.

Subsequently, in step S114, the MPU 31 performs processing of updating the information of the structure table 62 on the object which is the target of the measurement data found out in step S112, and after that, goes through the process to step S116. In the processing of step S114, more specifically, in the "measured number of times" and the "number of times of tracking" of the column in the structure table 62 on the object, the value in which "1" was added to the value stored in the "measured number of times" and the "number of times of tracking" at the time of processing is stored, respectively. Further, the "tracking flag" is set as the value "0".

On the other hand, in step S115, the MPU 31 performs the processing of newly registering the data of the object which is the target of the measurement data by using the measurement data which did not match up with any prediction datum, and after that, goes through the processing to step S116. In the processing of step S115, more specifically, the distance data in the measurement data are stored in the "current distance" and the "first-appearance distance" in the tracking table 61. Further, the data of the travel speed in the measurement data are stored in the "current distance", the "first-appearance distance", the "total speed value", and the "average speed". Further, in the "measured number of times" and the "number of times of tracking" in the tracking table 61, the value "1" is stored. In the "number of continuous failures in measurement", the value "0" is stored to be initialized, and in the "structure flag", the value "OFF" which illustrates that the object is a moving object is stored.

For each piece of the data after the matching processing in step S104, after the above explained processing of steps S105 to S115 is performed, the processing of steps S116 to S118 is performed, which is explained hereafter.

First, in step S116, the MPU 31 performs the processing of extracting the columns in which the "structure flag" is "OFF" by referring to the tracking table 61.

Next, in step S117, the MPU 31 performs the processing of reading the "current distance" and the "current speed" of the column extracted by the processing of step S116, of associating the read data with each column, and of making the data output from the interface apparatus 37.

Subsequently, in step S118, the MPU 31 performs the processing of storing the prediction result of predicting the subsequent detection information on the object of the detection target for each column for all the columns in the tracking table 61. In the examples, in the prediction processing, the MPU 31 firstly acquires the value of the "current distance" and the "average speed" of the column of the prediction target.

Subsequently, by multiplying a predetermined time period used in the processing of step S102 with the value of the acquired "average speed", the traveling amount of the object of the detection target in the predetermined time period is predicted. Then, by adding the prediction result of the traveling amount to the acquired value of the "current distance", the prediction value of the distance on the object is defined. After that, the MPU 31 stores the obtained prediction values of the distance and the traveling speed in the "prediction distance" and the "prediction speed" of the column of the prediction target, respectively.

After that, the MPU 31, after having completed the above mentioned processing of step S118, returns the processing to step S102 and repeats the above mentioned processing.

Processing as mentioned above is the processing of tracking a moving object. As the MPU 31 performs the processing of tracking a moving object, the computer 30 of FIG. 4 operates as the moving object tracking apparatus 10 of FIG. 3, and the moving object tracking is continued even when the moving object temporarily stops at the same position as a fixed object.

All examples and conditional language provided herein are intended for pedagogical purposes of aiding the reader in understanding the invention and the concepts contributed by the inventor to furthering the art, and are to be construed as limitation to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A moving object tracking apparatus comprising:
   a memory configured to store, for each object, detection information that includes a distance to an object and a traveling speed of the object for each predetermined detection timing detected by a radar apparatus which detects detection information on the object, wherein the radar apparatus detects the detection information by receiving a reflected wave from the object which is present in an irradiation objective site of an irradiated radar wave;
   a processor configured
      to predict, for each object, the distance and the traveling speed in the detection information to be newly detected by the radar apparatus in a next detection timing by using a current distance to the object in a history of the detection information stored in the memory, an average speed of the object that is determined from the traveling speed of the object in the history of the detection information, and a time period of the detection timing,
      to track the object by identifying the object which is the target of the detection information newly detected by the radar apparatus using a prediction result on the detection information,
      to determine whether the object tracked is a fixed object or a moving object using the history of the detection information on the object stored in the memory, and
      to output the detection information on the object determined to be the moving object.

2. The apparatus according to claim 1, wherein:
   the processor identifies the object of the target of the newly detected detection information as the object which is the target of the history of the detection information used by the processor for predicting the predicted distance, when a difference between the predicted distance and the distance in the newly detected detection information is smaller than a predetermined distance threshold.

3. The apparatus according to claim 1, wherein:
   the processor determines the object which is the target of the history of the detection information to be the fixed object when a first traveling speed is smaller than a predetermined speed threshold, and
   the first travelling speed is the traveling speed that is detected when the object is firstly detected by the radar apparatus and is included in the detection information stored for each object in the memory.

4. The apparatus according to claim 3, wherein:
   the processor further determines the object which is the target of the history of the detection information to be the fixed object when the detection information on the object which is the target of the history of the detection information is obtained by the radar apparatus at least as many times as a detection frequency threshold.

5. The apparatus according to claim 3, wherein:
   the processor further determines the object which is the target of the history of the detection information to be the fixed object when the processor tracks the object which is the target of the history of the detection information at least as many times as tracking frequency threshold.

6. The apparatus according to claim 1, wherein:
   the processor outputs the prediction result as the newly detected detection information on the object determined to be the moving object, when the detection information on the object which has been tracked is not included in the newly detected detection information by the radar apparatus.

7. The apparatus according to claim 1, wherein:
   the processor discontinues tracking the object when the detection information on the object which has been tracked is not included in the detection information newly detected by the radar apparatus a predetermined number of times continuously.

8. The apparatus according to claim 7, further comprising:
   the memory configured to store information of the distance on the object determined to be the fixed object by the determiner, wherein:
   the processor identifies the object which is the target of the newly detected detection information as the object which is the target of the information of the distance stored in the memory, when the object which is the target of the detection information newly detected by the radar apparatus is not identified from the prediction result on the detection information and when a difference between the distance indicated by the distance information stored in the memory and the distance in the newly detected detection information is smaller than a predetermined distance threshold, and resumes tracking the object.

9. A method comprising:
   storing, using a processor, for each object, detection information that includes a distance to an object and a traveling speed of the object for each predetermined detection timing detected by a radar apparatus which detects the detection information on the object, wherein the detection information is stored in a memory, and the radar apparatus detects the detection information by receiving a reflected wave from the object which is present in an irradiation objective site of an irradiated radar wave;
   predicting, using the processor, for each object, the distance and the traveling speed in the detection information to be newly detected by the radar apparatus in a next detection timing, by using a current distance to the object in a history of the detection information stored in the memory, an average speed of the object that is determined from the traveling speed of the object in the history of the detection information, and a time period of the detection tinning;

tracking, using the processor, the object by identifying the object which is the target of the detection information newly detected by the radar apparatus using a result of the predicting the detection information;

determining, using the processor, whether the object tracked by the tracking is a fixed object or a moving object using the history of the detection information on the object stored in the memory; and outputting, using the processor, the detection information on the object determined to be the moving object by the determination.

10. The method according to claim 9, wherein:
in the tracking, the object which is the target of the newly detected detection information is identified as the object which is the target of the history of the detection information used for the predicting of the distance, when the difference between the predicted distance and the distance in the newly detected detection information is smaller than a predetermined distance threshold.

11. The method according to claim 9, wherein:
in the determining, the object which is the target of the history of the detection information is determined to be the fixed object, when a first traveling speed is smaller than the predetermined speed threshold, and
the first travelling speed is the traveling speed that is detected when the object is firstly detected by the radar apparatus and is included in the detection information stored for each object in the memory.

12. The method according to claim 11, wherein:
in the determining, further, the object which is the target of the history of the detection information is determined to be the fixed object, when the detection information on the object which is the target of the history of the detection information is obtained by the radar apparatus at least as many times as a detection frequency threshold.

13. The method according to claim 11, wherein:
in the determining, further, the object which is the target of the history of the detection information is determined to be the fixed object, when the tracking on the object which is the target of the history of the detection information is performed at least as many times as a tracking frequency threshold.

14. The method according to claim 11, wherein:
in the outputting of the detection information on the object determined to be the moving object in the determining, the result of the predicting is output as the newly detected detection information on the object, when the detection information on the object which has been tracked by the tracking is not included in the detection information newly detected by the radar apparatus.

15. A computer-readable non-transitory recording medium having stored therein a program for causing a computer to execute a process comprising:
storing, for each object, detection information that includes a distance to an object and a traveling speed of the object for each predetermined detection timing detected by a radar apparatus which detects the detection information on the object, wherein the detection information is stored in a memory, and the radar apparatus detects the detection information by receiving a reflected wave from the object which is present in an irradiation objective site of an irradiated radar wave;

predicting, for each object, the distance and the traveling speed in the detection information to be newly detected by the radar apparatus in a next detection timing by using a current distance to the object in a history of the detection information stored in the memory, an average speed of the object that is determined from the traveling speed of the object in the history of the detection information, and a time period of the detection timing;

tracking the object by identifying the object which is the target of the detection information newly detected by the radar apparatus using a result of the predicting on the detection information;

determining whether the object tracked by the tracking is a fixed object or a moving object using the history of the detection information on the object stored in the memory; and outputting the detection information on the object determined to be the moving object by the determination.

16. The computer-readable recording medium according to claim 15, wherein:
in the tracking, when the difference between the predicted distance and the distance in the newly detected detection information is smaller than a predetermined distance threshold, the object which is the target of the newly detected detection information is identified as the object which is the target of the history of the detection information used for the predicting of the distance.

17. The computer-readable recording medium according to claim 15, wherein:
in the determining, when a first traveling speed is smaller than a predetermined speed threshold,
the first travelling speed is the traveling speed that is detected when the object is firstly detected by the radar apparatus and is included in the detection information stored for each object in the memory,
the object which is the target of the history of the detection information is determined to be the fixed object.

18. The computer-readable recording medium according to claim 17, wherein:
in the determining, further, when the detection information on the object which is the target of the history of the detection information is obtained by the radar apparatus at least as many times as a detection frequency threshold, the object which is the target of the history of the detection information is determined to be the fixed object.

19. The computer-readable recording medium according to claim 15, wherein:
in the determining, when the tracking on the object which is the target of the history of the detection information is performed at least as many times as a tracking frequency threshold, the object which is the target of the history of the detection information is determined to be the fixed object.

20. The computer-readable recording medium according to claim 15, wherein:
in the outputting of the detection information, when the detection information on the object which has been tracked by the tracking is not included in the detection information newly detected by the radar apparatus and when the object is the object determined to be a moving object, the result of the predicting is output.

* * * * *